US008726513B2

(12) United States Patent
Braun et al.

(10) Patent No.: US 8,726,513 B2
(45) Date of Patent: May 20, 2014

(54) METHOD FOR PROCESSING A SIDE EDGE OF A PANEL, AND A DEVICE FOR CARRYING OUT THE METHOD

(75) Inventors: Roger Braun, Willisau (CH); Wolfgang Gollatz, Wittstock (DE)

(73) Assignee: Flooring Technologies Ltd., Pieta (MT)

( * ) Notice: Subject to any disclaimer, the term of this patent is extended or adjusted under 35 U.S.C. 154(b) by 1262 days.

(21) Appl. No.: 12/594,781

(22) PCT Filed: Dec. 19, 2008

(86) PCT No.: PCT/EP2008/010959
§ 371 (c)(1), (2), (4) Date: Oct. 5, 2009

(87) PCT Pub. No.: WO2009/080328
PCT Pub. Date: Jul. 2, 2009

(65) Prior Publication Data

US 2010/0058590 A1 Mar. 11, 2010

(30) Foreign Application Priority Data

Dec. 20, 2007 (DE) ......................... 10 2007 062 430

(51) Int. Cl.
*B23P 13/02* (2006.01)

(52) U.S. Cl.
USPC ........................... 29/897.32; 29/558; 144/371

(58) Field of Classification Search
USPC ................. 29/558–559, 897.32; 52/539, 588, 52/592.1, 592.2, 745.19; 144/371; 428/50, 428/151
See application file for complete search history.

(56) References Cited

U.S. PATENT DOCUMENTS 1,895,054 A 1/1933 Steinmeyer
2,835,172 A * 5/1958 Barker et al. ................ 409/144

(Continued)

FOREIGN PATENT DOCUMENTS

DE 35 22 971 1/1987
DE 102 24 540 5/2004

(Continued)

OTHER PUBLICATIONS

Notification of Transmittal of Translation of the International Preliminary Report on Patentability for corresponding International Application No. PCT/EP2008/010959, Jan. 26, 2009.

(Continued)

*Primary Examiner* — Alexander P Taousakis
(74) *Attorney, Agent, or Firm* — Andrew M. Calderon; Roberts Mlotkowski Safran & Cole, P.C.

(57) ABSTRACT

The invention relates to a method for processing a side edge of a panel (2), in particular a floor panel, with a top (18) and a bottom (19), which on at least two side edges lying opposite one another has profiles corresponding to one another such that two identically embodied panels (2) can be joined and locked to one another in the horizontal and vertical direction by an essentially vertical joining movement, wherein the locking in the vertical direction can be produced by at least one tongue element formed in one piece from the core and moveable in the horizontal direction, which tongue element during the joining movement snaps in behind a locking edge extending essentially in the horizontal direction and the tongue element is exposed by means of at least one essentially vertical slot with respect to the core, and at least one of the slots is not embodied in a continuous manner over the entire length of the side edge, wherein the at least one non-continuous slot is produced by at least one guided tool (41) such that the panel (2) is conveyed in a transport direction (x) under the tool (41), the tool (41) dips into the core of the panel (2) by means of a swivel motion and is lifted out again in the opposite direction before the panel (2) has been completely conveyed past under the tool (41).

11 Claims, 12 Drawing Sheets

(56) References Cited

U.S. PATENT DOCUMENTS

Figures 1, 2, 3, 4:
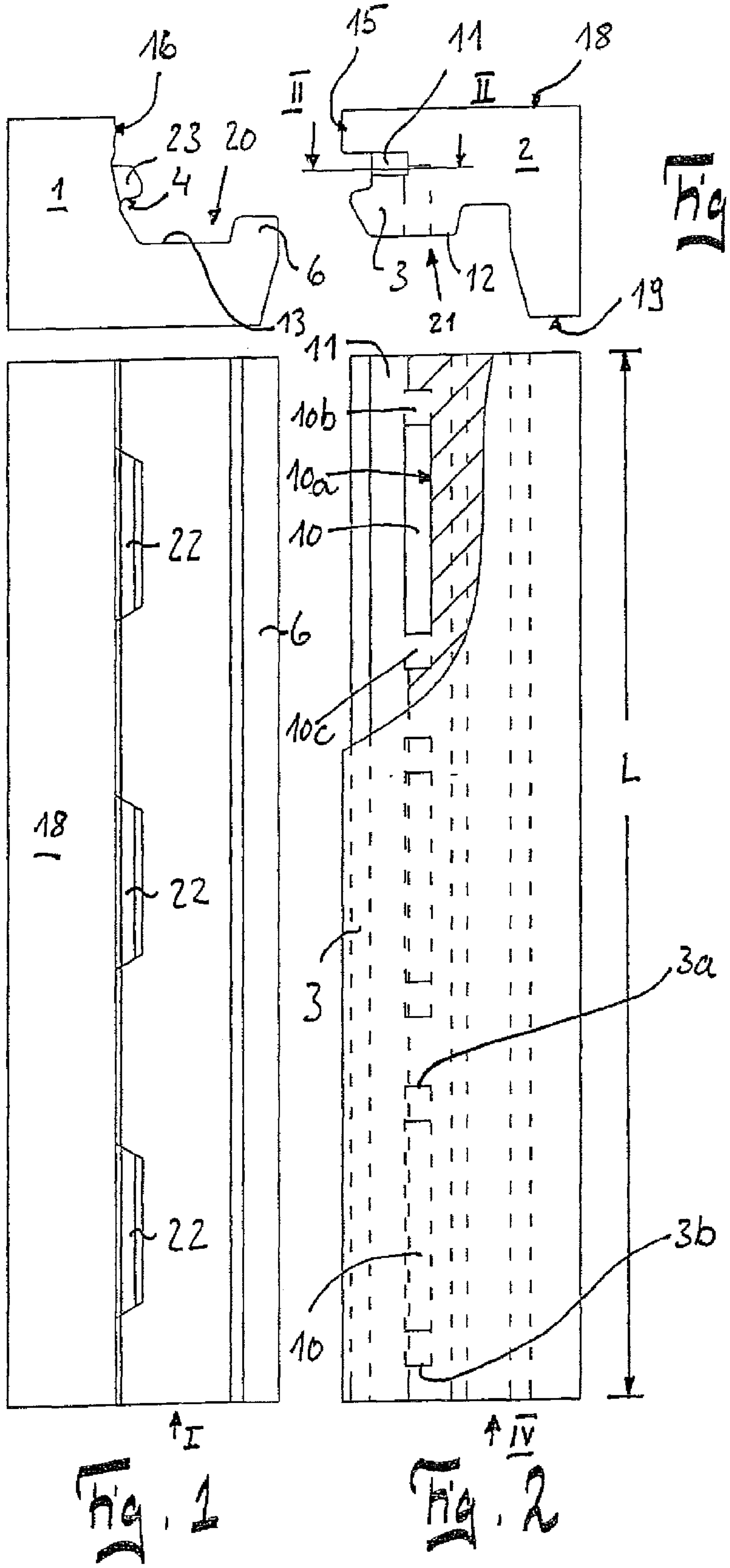

| | | | | |
|---|---|---|---|---|
| 2,944,466 | A * | 7/1960 | Rohlfs | 409/117 |
| 5,553,645 | A | 9/1996 | Durney | |
| 6,006,486 | A * | 12/1999 | Moriau et al. | 52/589.1 |
| 6,196,286 | B1 * | 3/2001 | Susnjara | 144/347 |
| 7,644,557 | B2 * | 1/2010 | Moriau et al. | 52/745.19 |
| 8,302,361 | B2 * | 11/2012 | Braun et al. | 52/588.1 |
| 8,464,768 | B2 * | 6/2013 | Dammers | 144/371 |
| 8,511,040 | B2 * | 8/2013 | Braun et al. | 52/745.19 |
| 2008/0066416 | A1 * | 3/2008 | Moriau et al. | 52/588.1 |
| 2008/0134607 | A1 * | 6/2008 | Pervan et al. | 52/395 |
| 2012/0260602 | A1 * | 10/2012 | Baker et al. | 52/745.19 |

FOREIGN PATENT DOCUMENTS

| | | |
|---|---|---|
| DE | 102 52 864 | 5/2004 |
| DE | 10 2005 026 554 | 12/2006 |
| DE | 10 2007 041 024 | 3/2009 |
| EP | 1 350 904 | 10/2003 |
| EP | 1 650 375 | 4/2006 |
| EP | 1 808 311 | 7/2007 |
| FR | 2 697 463 | 5/1994 |
| WO | 95/05274 | 2/1995 |
| WO | 2006/053449 | 5/2006 |
| WO | 2006/131289 | 12/2006 |
| WO | 2006/056172 | 6/2009 |

OTHER PUBLICATIONS

International Preliminary Report on Patentability for corresponding International Application No. PCT/EP2008/010959, Jul. 5, 2009.

Written Opinion of the International Searching Authority for corresponding International Application No. PCT/EP2008/010959, May 1, 2009.

* cited by examiner

METHOD FOR PROCESSING A SIDE EDGE OF A PANEL, AND A DEVICE FOR CARRYING OUT THE METHOD

The invention relates to a method for processing a side edge of a panel, in particular a floor panel, with a top and a bottom, which on at least two side edges lying opposite one another has profiles corresponding to one another such that two identically embodied panels can be joined and locked to one another in the horizontal and vertical direction by an essentially vertical joining movement, wherein the locking in the vertical direction can be produced by at least one tongue element formed in one piece from the core and moveable in the horizontal direction, which tongue element during the joining movement snaps in behind a locking edge extending essentially in the horizontal direction and the tongue element is exposed by means of at least one essentially vertical slot with respect to the core, and at least one of the slots is not embodied in a continuous manner over the entire length of the side edge.

A panel of this type is described in German patent application 10 2007 041 024.9, the disclosure of which is referenced herewith in its entirety.

Panels in which the locking is carried out via a plastic insert, are known, e.g., from EP 1 650 375 A1. The type of locking realized with this type of panels is preferably provided on the transverse side of floor panels. However, it can also be provided on the longitudinal side or on the longitudinal side as well as on the transverse side. The tongue element is composed of plastic and is inserted in a groove running horizontally on one of the side edges and beveled on the top. Similar to a door latch, by means of the bevel the tongue element is pressed inwards into the groove by the panel to be newly set, when the underside of this panel meets the bevel and is further lowered. When the panel to be newly laid has been lowered completely to the subfloor, the tongue element snaps into a groove inserted horizontally in the opposite side edge and locks the two panels in the vertical direction. Special injection molds are necessary for the production of this tongue element, so that the production is relatively expensive. Furthermore, a high quality plastic must be used in order to provide adequate strength values, which makes the tongue element even more expensive. If plastics are used with strength values that are too low, this leads to relatively large dimensions of the tongue elements, since this is the only way to ensure that corresponding forces can be generated or transmitted. Additional expenses result because the locking element is embodied as a separate component. The production of the locking element is carried out spatially separately from the panels for technological reasons, so that an integration into the continuous production process, in particular for floor panels, is likely to be impossible. Through the different materials, wood material on the one hand and plastic on the other hand, the adjustment of production tolerances from two separate production processes is complex and cost-intensive. Since the locking in the vertical direction would be ineffective if the locking element were missing, in addition, this must be secured from falling out of the groove inserted in the side edge in the further production process and during transport. This securing is also complex. Alternatively thereto, the locking element could be made available to the consumer separately.

The floor panels under consideration are being laid with increasing frequency by do-it-yourselfers, so that, in principle, it is possible, due to a lack of experience, for the required number of locking elements to be initially miscalculated and not obtained in sufficient quantity in order to be able to lay a room completely. Furthermore, it cannot be ruled out that the do-it-yourselfer will make a mistake upon placing inserting the tongue element, which means that precise locking is not possible and the bond separates over time, which is then wrongly attributed by the consumer to the quality supplied by the manufacturer.

Panels are known from DE 102 24 540 A1, which are profiled on two side edges lying opposite one another such that hook-shaped connection elements are formed for locking in the horizontal direction. For locking in the vertical direction, positive engagement elements spaced apart from one another horizontally and vertically are provided on the connection elements and undercuts corresponding thereto are provided with respectively one horizontally aligned locking surface. The transverse extension of horizontally aligned locking surfaces of this type is approx. 0.05 to 1.0 mm. The dimensioning must be so small in order for the joining of two panels to remain possible at all. However, this inevitably means that only low, vertically directed forces can be absorbed, so that production must be carried out with extremely low tolerances in order to ensure that the connection does not spring open with normal stress in the case of even slight irregularities in the floor and/or soft subfloors.

The tongue element is embodied in one piece from the core so that the adjustment of the tolerances of different components is omitted and in addition it is ensured that no components are missing with the end user.

In order to make it possible to connect the tongue element to the core and at the same time to be able to realize an elasticity of the elements, it is necessary to carry out milling cuts that are not continuous, but are discontinuous. If this is achieved in terms of milling technology, the panel must not be moved during the milling operation, since otherwise continuous cuts would be made with the existing high throughput speeds. A milling operation would thus be very slow with the braking of the panel to a halt, dipping and moving the milling unit and the subsequent acceleration of the finished panel for further transport.

One possibility for producing corresponding millings with tools is to mount the tools on a traversing unit that transports the tools in the feed direction (transport direction) of the panels. The time in which the insert millings are produced is considerably increased thereby, whereby commercially available motor spindles can also perform corresponding movements of the tools in order to carry out the referenced millings.

However, the disadvantage of this production variant is, on the one hand, the high expenditure in terms of equipment and, on the other hand, the large space requirement, which results from the moveability of the tools in the feed direction of the panels. However, this additional space requirement is too large for already existing installations, into which a further processing position is to be integrated, and thus only useful for newly designed installations.

Since formations of this type cannot be produced on one-piece panels with conventional milling units in a continuous pass, it is necessary to separate the panels to be processed and to process them in a stationary manner. This is very time-intensive and therefore also cost-intensive.

The production of a panel of this type is complex in particular when a plurality of tongue elements is provided and also a corresponding number of locking edges is to be provided to this end in the groove, because then travelling tools must then be provided on both side edges. In some cases there is no room for this in conventional milling stations, so that different clampings are necessary on different machines, which increases the production time and requires correspondingly generous tolerances.

A method for inserting a locking groove by means of a milling tool is known from DE 10 2005 026 554 A1, which contains a drive, a milling head and a transmission device for transmitting the rotation as well as a mounting for the milling head. Because of the mounting, the milling head has a free radius on the mounting side, which makes it possible for it to be located completely in the part of the connection groove surrounded by groove flanks on both sides during the insertion of the locking groove.

To solve the problem it is provided that the at least one non-continuous slot is produced by a tool preferably guided on a circular path such that the panel is conveyed in a transport device under the tool, the tool dips into the core of the panel by means of a swivel motion and is lifted out again in the opposite direction before the panel has been completely conveyed past under the tool.

Through this embodiment it is possible to embody the previously rigid vertical locking means in a flexible manner and to produce geometries that do not extend over the entire length of a panel. The space requirement necessary is very small due to the swivel motion of the tool, so that a convention double-ended profiler can be used, at the end of which an additional processing station for the production of the at least one non-continuous slot is flange-mounted.

To expose the tongue element with respect to the core, preferably additionally at least one essentially horizontal slot can be provided.

Preferably several non-continuous slots are produced in that a plurality of tools spaced apart from one another is provided in the transport direction of the panels, which tools dip into the core of the panel simultaneously.

A device for carrying out the method is characterized in that at least one milling tool, a laser tool, a water-jet or sandblasting device or a plasma arc torch is attached to a swivel-mounted carrier, which can be actuated via a servo motor or a telescopic cylinder.

In order to be able to produce several slots at the same time, it is in particular advantageous if several tools are arranged one behind the other on the carrier based on the transport direction of the panel. It is also conceivable that the slots are punched.

In order to keep the space requirement as small as possible, in addition to the at least one tool, preferably the drive thereof, which comprises a motor and a transmission, is also arranged on the carrier. Each tool can be operated by a separate motor. However, a motor can also be provided for the drive of several tools.

Figure 5:
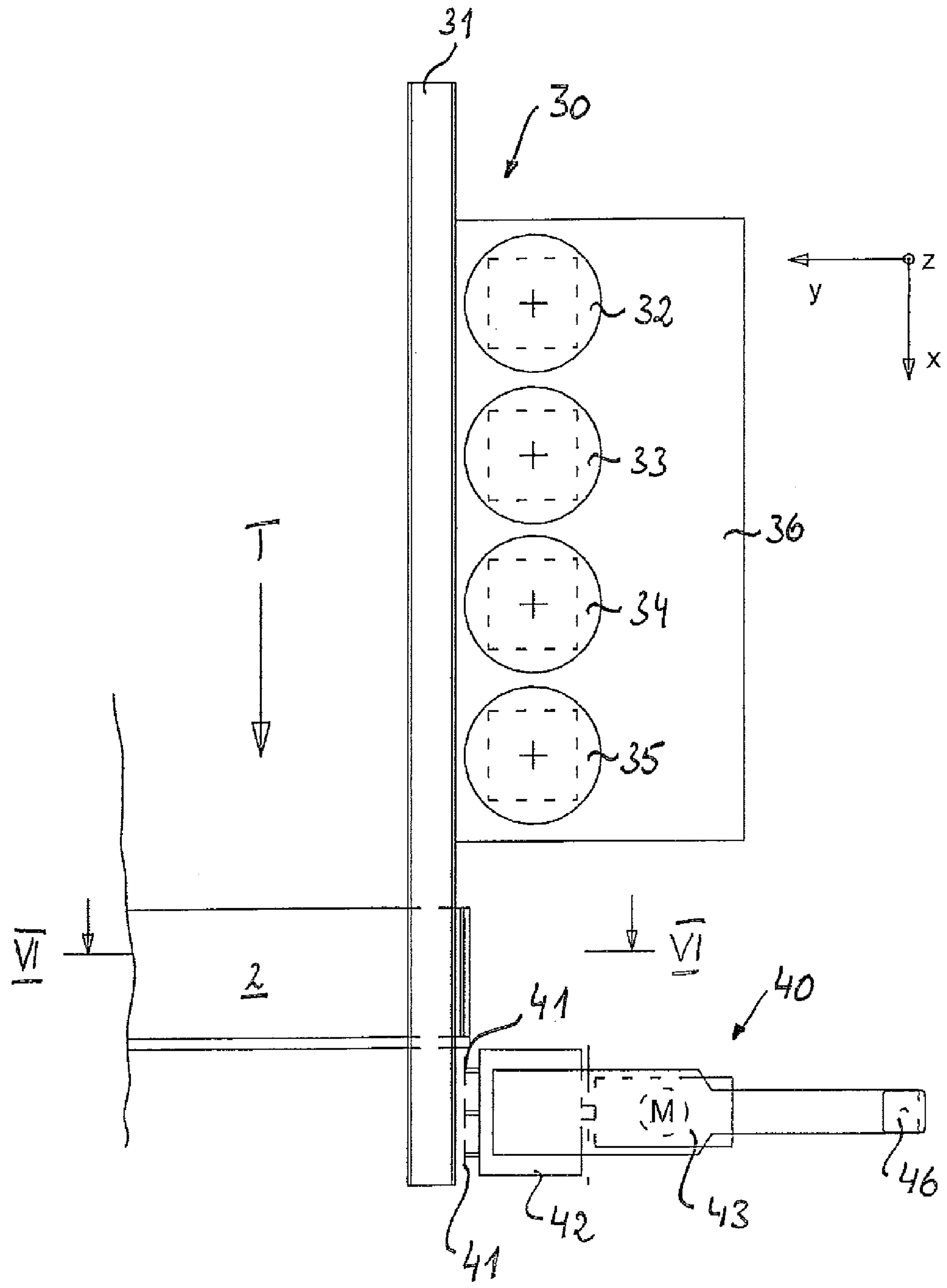
Figure 6:
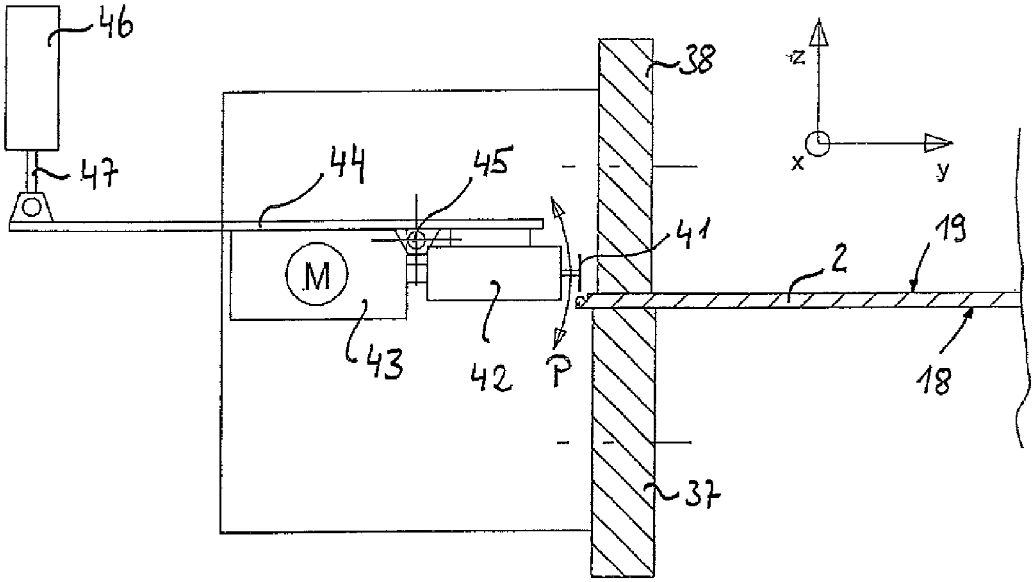
Figure 7:
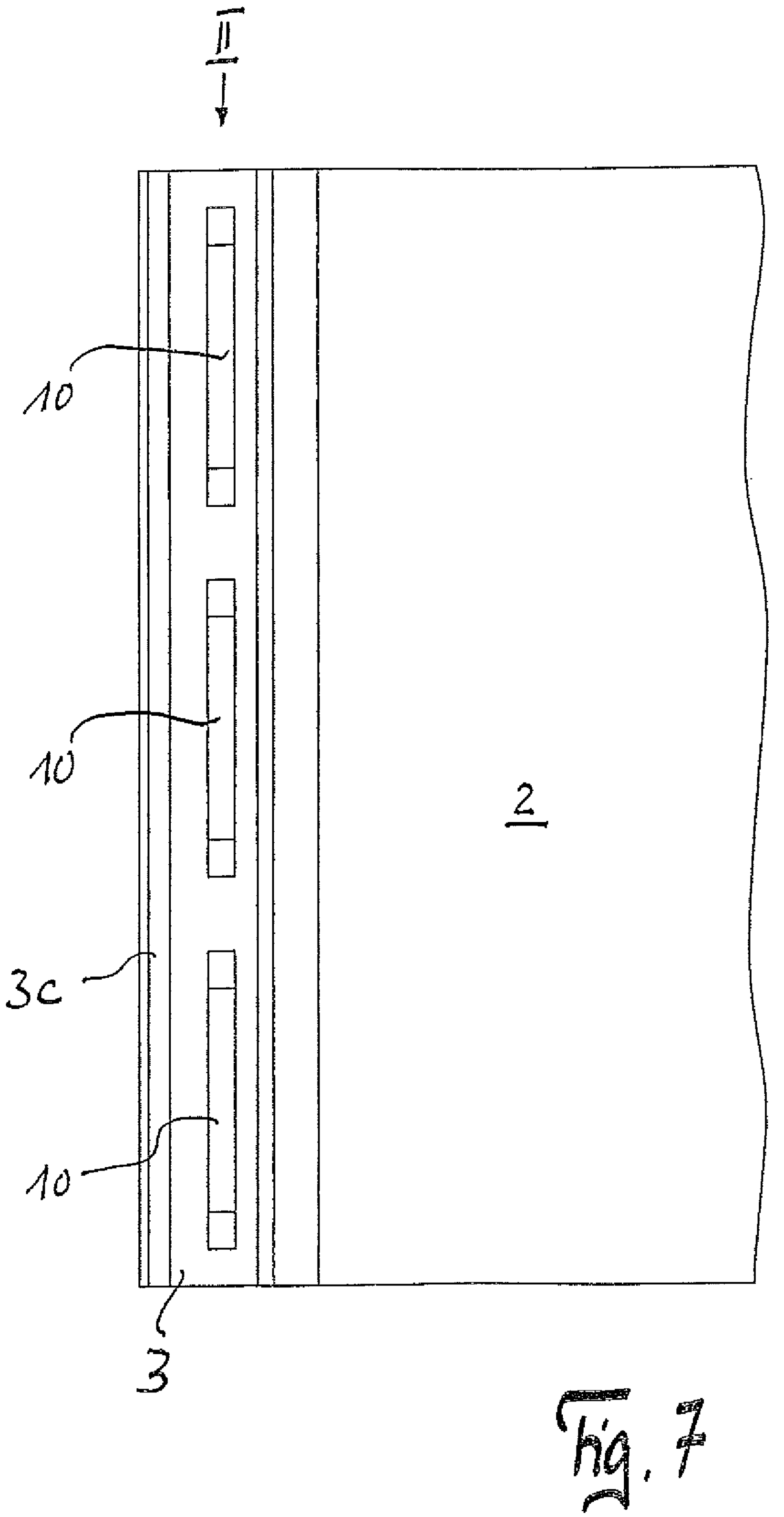
Figure 8:
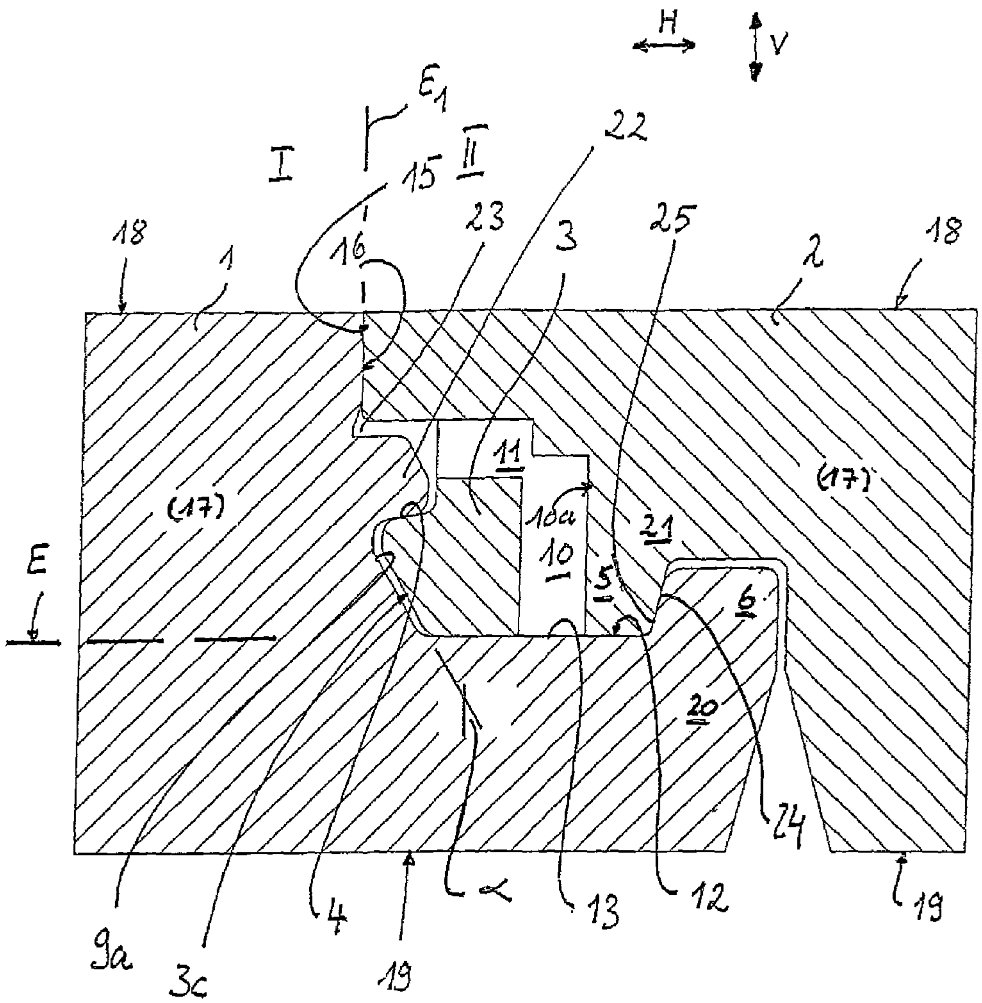
Figure 9:
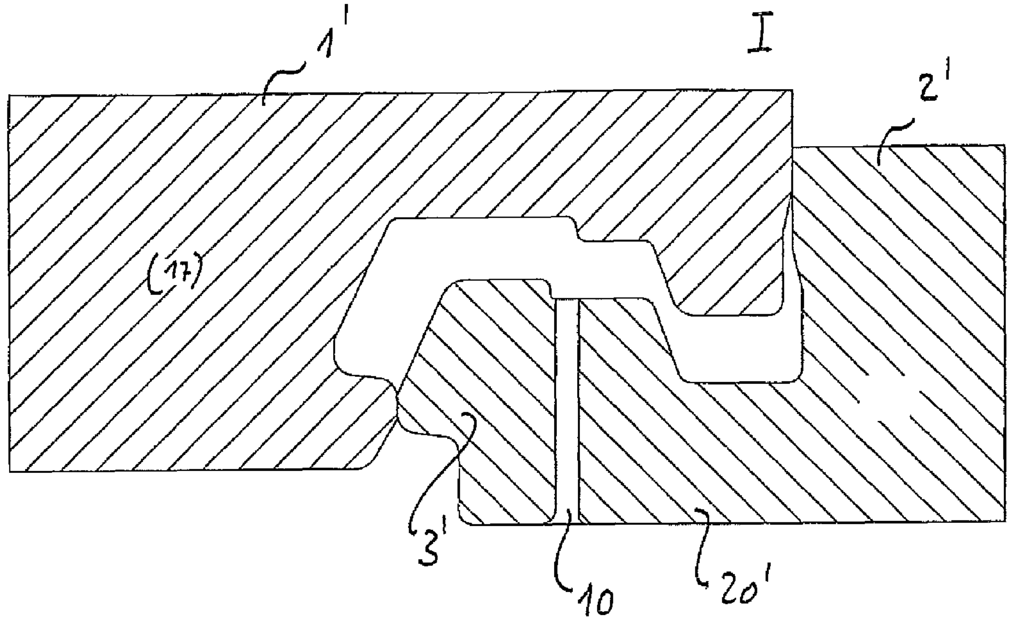
Figure 10:
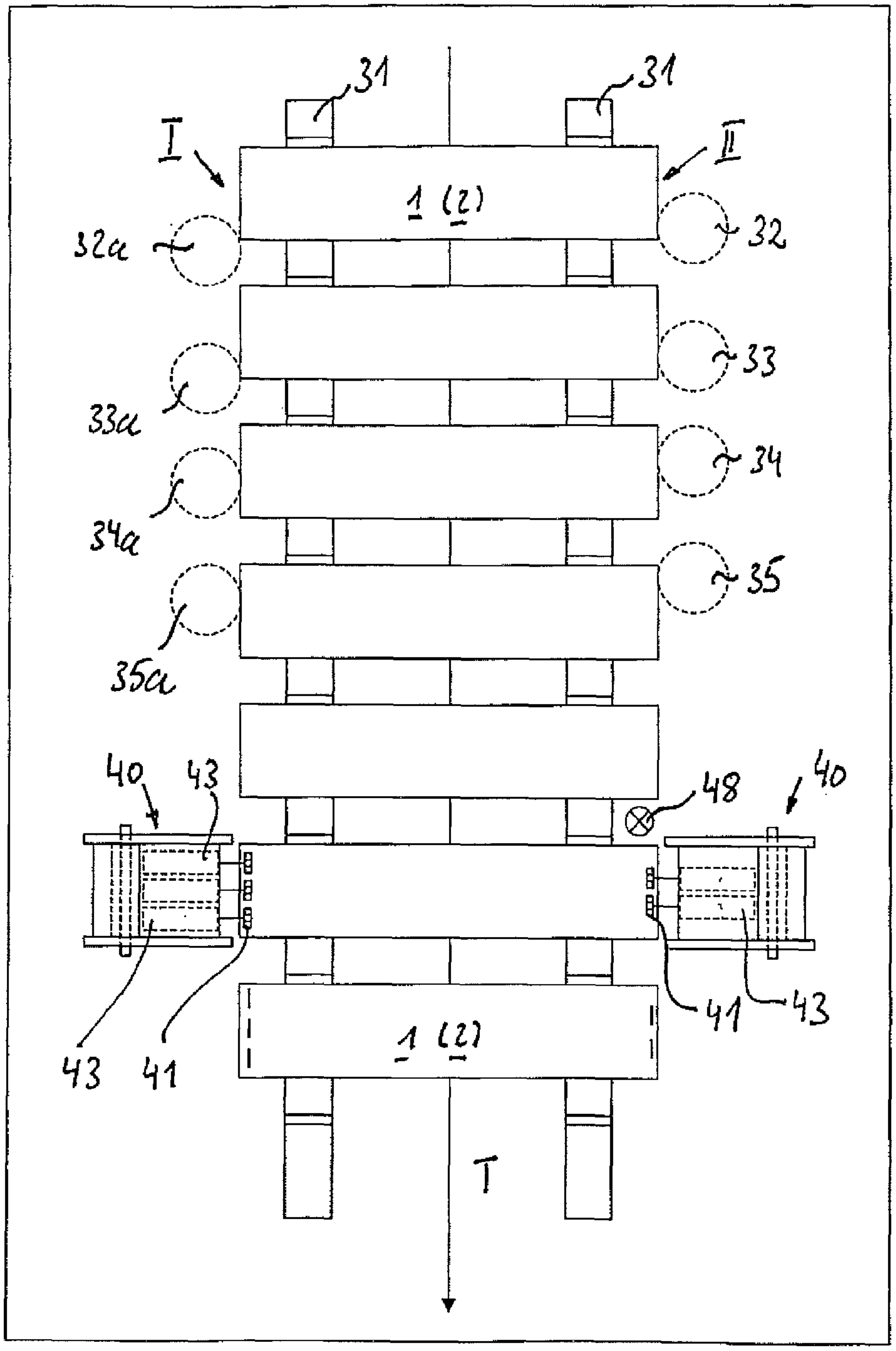
Figure 11:
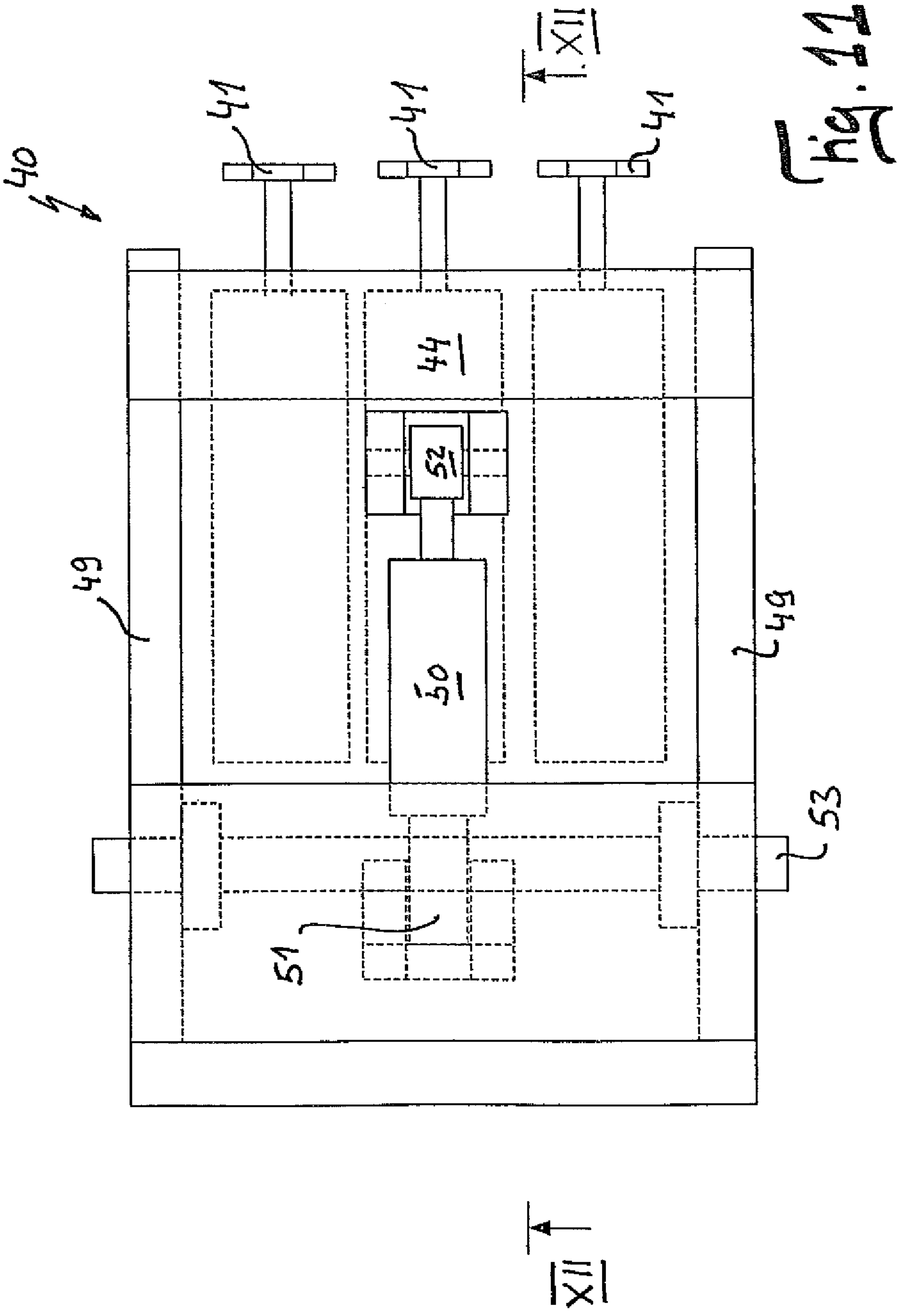
Figure 12A:
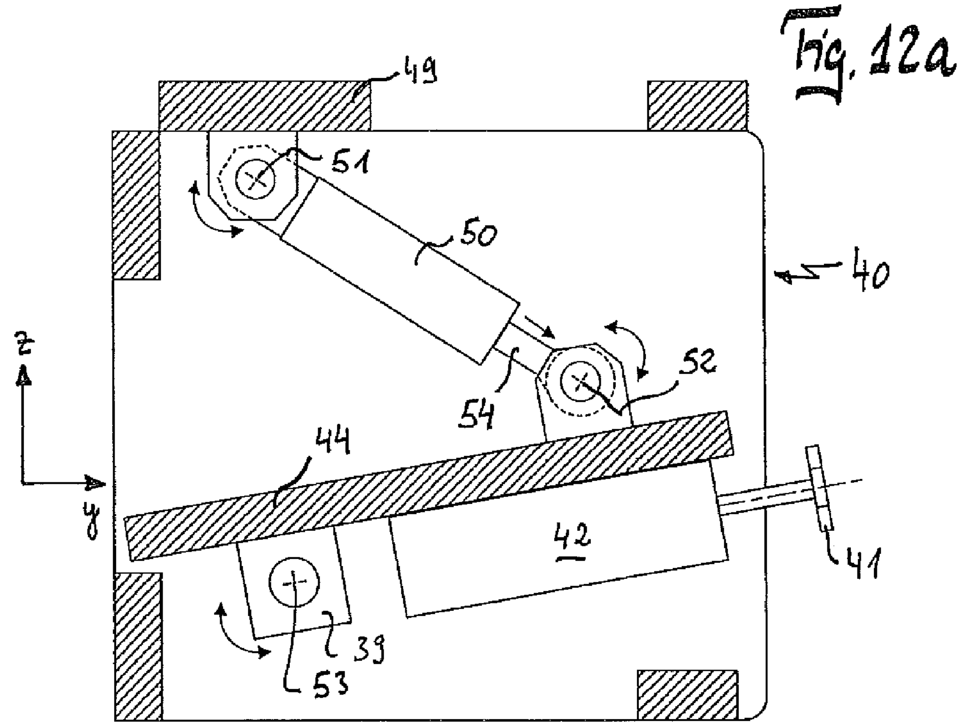
Figure 12B:
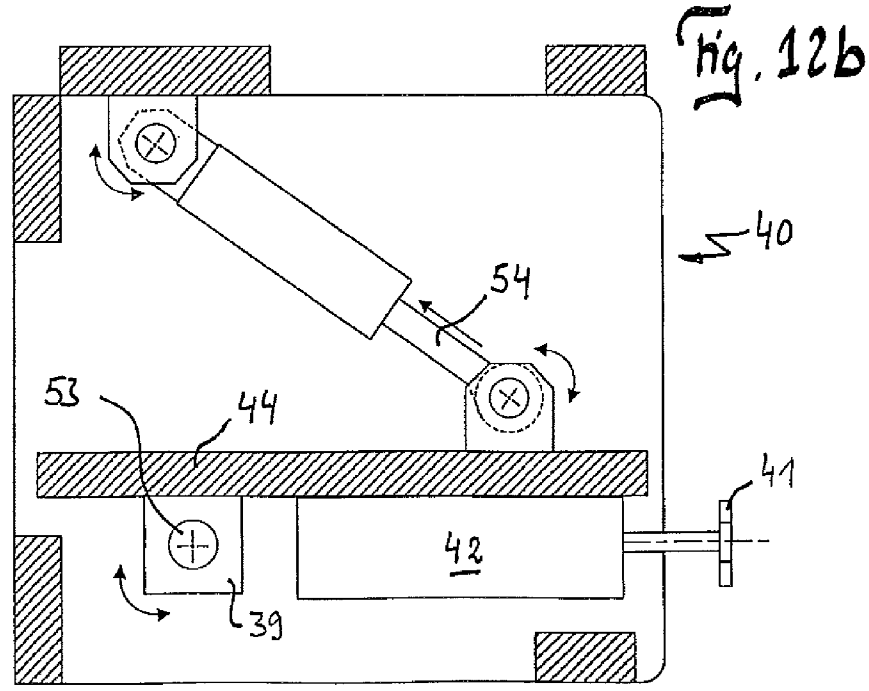
Figure 13B:
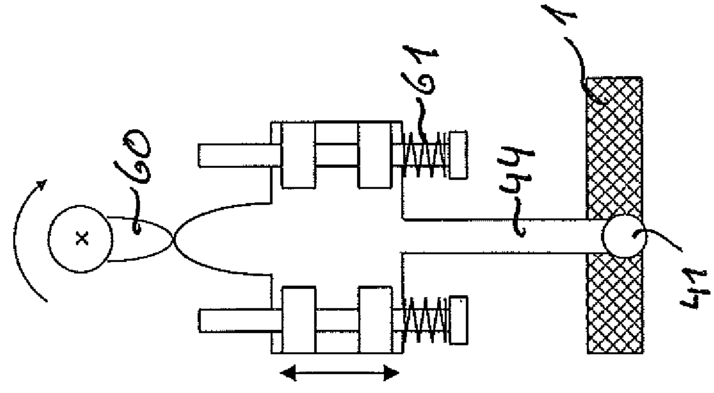
Figure 13A:
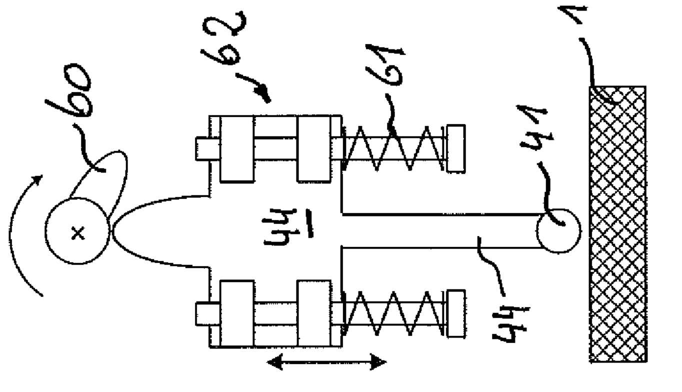
Figure 14B:
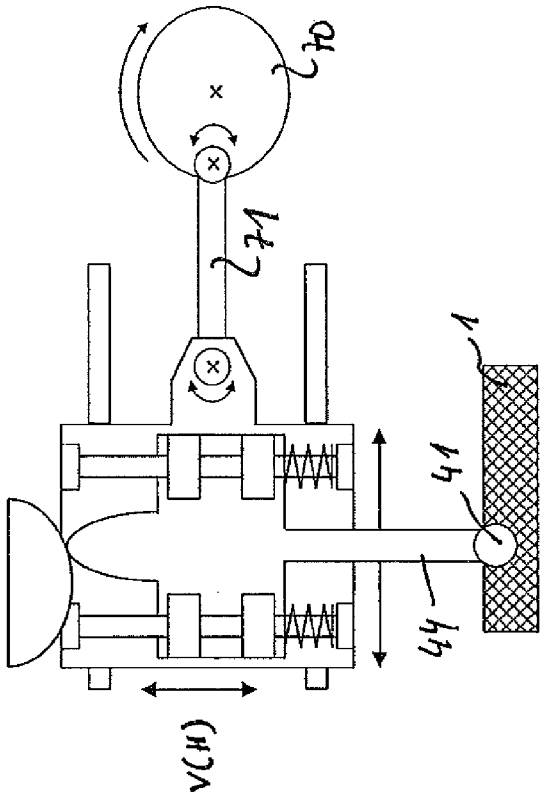
Figure 14A:
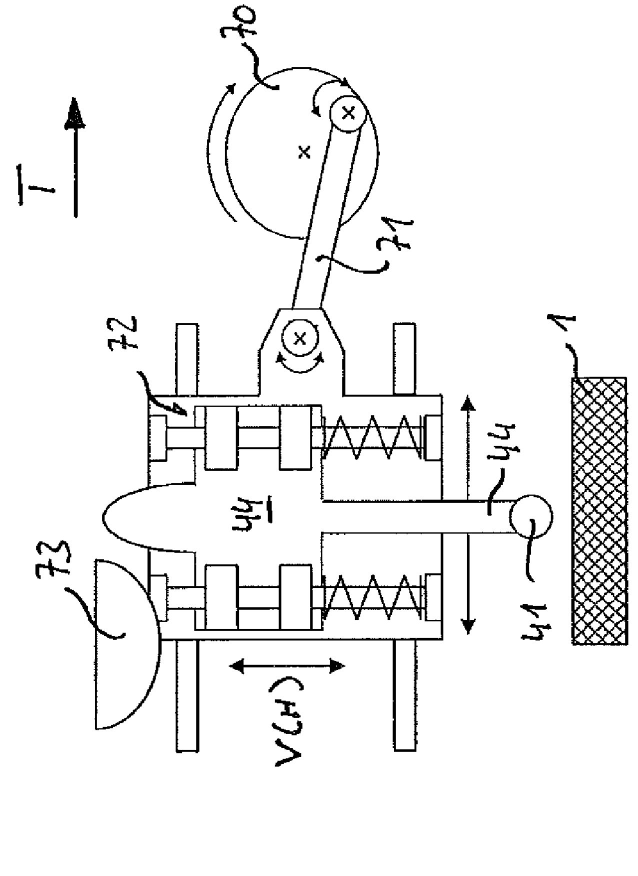
Figure 15B:
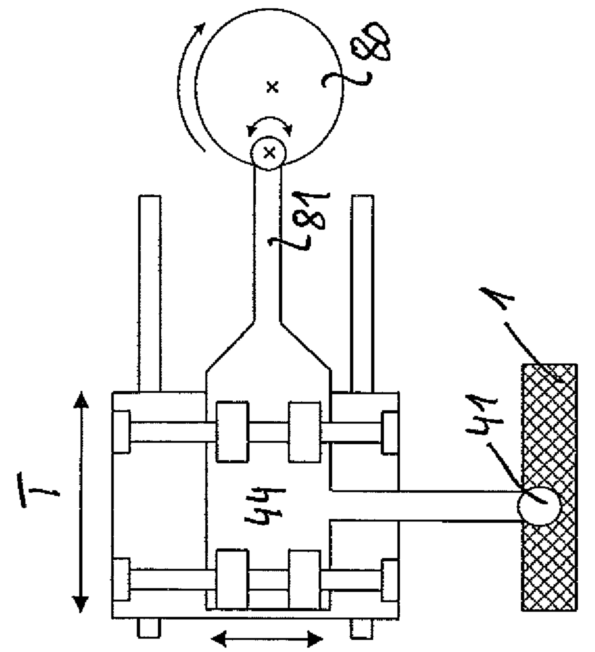
Figure 15A:
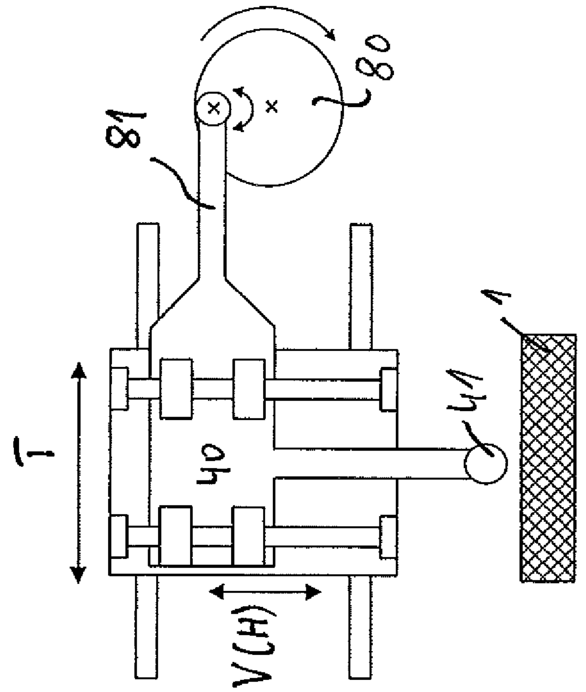

An exemplary embodiment of the method according to the invention is described in more detail below with the aid of a drawing. They show:

FIG. 1 The plan view of the side edge I of a panel;

FIG. 2 The plan view of the opposite side edge II of the same panel;

FIG. 3 The view according to sight arrow III according to FIG. 1;

FIG. 4 The view of the panel according to sight arrow IV according to FIG. 2;

FIG. 5 The plan view of a diagrammatically represented profiling apparatus;

FIG. 6 The section along the line VI-VI according to FIG. 5;

FIG. 7 The bottom view of a milled panel;

FIG. 8 The representation of two panels connected to one another of a first embodiment in section at the joint;

FIG. 9 The representation of two panels connected to one another of a second embodiment in section at the joint;

FIG. 10 The diagrammatic plan view of a double-ended profiler;

FIG. 11 The diagrammatic plan view of a processing station;

FIG. 12*a* The section along the line XII-XII according to FIG. 11 in the lifted position of the tool;

FIG. 12*b* The section along the line XII-XII according to FIG. 11 in the lowered position of the tool;

FIG. 13*a* A schematic sketch of an alternative device for moving a processing tool in the functionless position;

FIG. 13*b* A schematic sketch of an alternative device for moving a processing tool in the functional position;

FIG. 14*a* A schematic sketch of an alternative device for moving a processing tool in the functionless position;

FIG. 14*b* A schematic sketch of an alternative device for moving a processing tool in the functional position;

FIG. 15*a* A schematic sketch of an alternative device for moving a processing tool in the functionless position;

FIG. 15*b* A schematic sketch of an alternative device for moving a processing tool in the functional position.

The panels 1, 2 are embodied identically. They comprise a core 17 of a wood material or a wood material/plastic mixture. The panels 1, 2 are profiled on their side edges I, II lying opposite one another, wherein the side edge I was milled from the top 18 and the side edge II was milled from the bottom 19. The tongue element is embodied on the side edge II, which was produced by milling free the core 17, in that a horizontal slot 11 and a slot 10 essentially running vertically were milled. The side edges I, II have the length L. In the longitudinal direction of the side edge II, the tongue element 3 is connected at its ends 3*a*, 3*b* to the core material. The exposure of the tongue element 3 from the core 17 is carried out exclusively through the slots 10, 11. The outer edge 3*c* of the tongue element 3 is tilted at an angle α with respect to the top 18 of the panel 2. The vertical surfaces of the side edges I, II are machined such that contact surfaces 15, 16 are formed in the area of the top 18.

On the side edge I lying opposite the tongue element 3, the panel I is provided with a locking lug 22 extending essentially in the horizontal direction H, the lower side wall of which forms a locking edge 4 running essentially horizontally. The locking lug 22 projects laterally over the contact surface 16 of the panel 1. Below the locking lug 22 a groove 9 is embodied, which accommodates a part of the tongue element 3 for locking two panels 1, 2 in the vertical direction V. As shown in FIG. 2, the groove bottom 9*a* of groove 9 runs parallel to the outer edge 3*c* of the tongue element 3, which facilitates the production of the groove 9, but it could also be embodied strictly in the vertical direction V or at an angle deviating from the angle α. The locking lug 22 is short compared to the length of the hook element 20. Between the top of the locking lug 22 and the contact surface 16 a dust pocket 23 is formed from the material of the core 17 on the side edge I of the panel 1.

The locking of the two panels 1, 2 in the horizontal direction H is carried out via the hook elements 20, 21 produced by milling through a stepped profile and in the vertical direction V via the tongue element 3 in connection with the locking edge 4 on the locking lug 22. An at least partially planar top surface 12 is embodied on the shoulder 5, extending downwards, of the hook element 21, which top surface interacts with a contact surface 13 embodied on the hook element 20 on the opposite side edge I, which contact surface projects back behind the projection 6. The top surface 12 and the contact surface 13 end in the same horizontal plane E, so that the panels 1, 2 connected to one another are supported on one another. The surface 24 of the hook element 21 facing towards the core 17 runs tilted with respect to the vertical and together with the correspondingly tilted surface 25 facing towards the core 17 forms a locking edge of two connected panels 1, 2 on the shoulder. The profiling of the hook elements 20, 21 is selected such that a preloading is produced in the joint and the vertical contact surfaces 15, 16 of the panels 1, 2 are pressed towards one another, so that no visible gap results on the top 18 of two panels 1, 2 connected to one another. In order to make it easier to join the panels, 1, 2, the shoulder 6, projecting upwards, of the hook element 20 and the shoulder 5, projecting downwards, of the hook element 21 are beveled or blunted on their edges. In order to simplify the production to embody the tongue element 3, either the slots 11 running horizontally (FIGS. 2, 4) or the slot 10 running essentially vertically (FIGS. 6, 8) can be continuous, that is extend over the full length L of the side edge II.

The panel 2 is connected to the panel I already lying on the subfloor, in that the panel 2 is placed against the side edge I of the panel 1 and lowered in the direction of the subfloor by an essentially vertical joining connection. When the lower edge 3*d* of the tongue element 3 comes into contact with the top 18 of the panel 1, it is pressed in the direction of the core 17 with the further joining movement due to its outer side edge 3*c* running at an angle α upon contact with the contact surface 16, so that it deflects in the direction H. The panel 2 is lowered further downwards. Once the tongue element 3 reaches a position with respect to the groove 9, it is springs out due to the restoring forces inherent in the material and then snaps into the groove 9, where it bears against the locking edge 4 with its top 3*e* running essentially horizontally. At the same time, the hook elements 20, 21 engage until the top surface 12 is supported on the contact surface 13. The panels 1, 2 are then connected and locked to one another. The inner wall 10*a* of the slot 10 serves as limit of the deflection path of the tongue element 3 in order to prevent the connection of the tongue element 3 at its ends 3*a*, 3*b* with the core 17 from being torn out due to a dipping movement too far. The surface, i.e., the height and the width, to which the ends 3*a*, 3*b* are connected to the core 17, determine the spring rate of the tongue element 3. As FIG. 2 shows, three tongue elements 3 can be embodied over the length L of the side edge II and three locking lugs 22 can be formed on the opposite side edge I. It is also definitely conceivable to embody the tongue elements 3 to be shorter and to provide five, six or even seven or more tongue elements 3 and corresponding locking lugs 22.

When the vertical slot 10 is embodied to be narrow enough, it is possible to keep the tongue element 3 connected to the core 17 only at one of its ends 3*a* or 3*b*. An embodiment of this type has the advantage that the tongue element 3 can also expand in the direction of the length L of the side edge II. The then free end 3*a* or 3*b* is then supported on the inner wall 10*a* of the slot 10. FIG. 2 shows that vertical slots 10 are provided over the length L of the panel 3. FIG. 6 shows a panel with three slots 11 running horizontally.

FIG. 9 shows an embodiment of the panels 1', 2' in which the tongue element 3 is exposed with respect to the core 17 only by one or more vertical slots 10. In this embodiment, the tongue element 3' is provided on the hook element 20' forming a lower lip. The locking is carried out per se analogously to the previously described exemplary embodiment.

The locking is releasable in all of the exemplary embodiments, in that the panels 1, 1', 2, 2' are displaced relative to one another along the side edges I, II or in that an unlocking pin (not shown) is inserted laterally into the joint.

The panels 1, 2 are usually provided on their top 18 with a pattern that can be printed directly onto the top 18. The pattern is usually covered by a wear-resistant layer, into which a structure corresponding to the pattern can be embossed.

This type of locking described above is preferably provided on the transverse side of panels 1, 2, which on their longitudinal side can be connected to one another through angling in and pivoting down onto the subfloor, as is described in DE 102 24 540 A1. However, it is also conceivable to embody this profiling on the longitudinal sides as well as on the transverse sides, so that the panels can be connected and locked to one another on all side edges by a purely vertical joining movement.

The processing station according to the invention, which is shown diagrammatically in FIGS. 5 and 6, comprises a double-ended profiler known from the prior art, such as is sold, for example, by Homag under the name "Powerline," with processing stations additionally flange-mounted thereto.

The double-ended profiler 30 fundamentally comprises two profiling machines 36 that are largely identical but structured in a mirror-inverted manner, wherein one of the profiling machines 36 is firmly anchored to the subfloor and the other is arranged on slide rails that make it possible for it to move in the y direction.

The profiling machines 36 in turn each comprises two parts. A chain conveyor 31, which has a chain with chain links mounted on roller bearings and a so-called top pressure. The top pressure essentially comprises a flexible belt and is spring-mounted. The chain conveyor 31 as well as the top pressure (not shown here) of both profiling machines 36 are connected to one another with the aid of long shafts and driven by the same motors. Both machine parts of a profiling machine can be displaced with respect to one another in the z direction, wherein the chain conveyor 30 located below is connected fixedly to the subfloor in the vertical direction. Usually, the top pressure located above is lowered to the chain conveyor 31 until the spring-mounted belt comes into contact with the conveyor chain of the chain conveyor 31, whereby the panels 1, 2 to be transported are pressed onto the conveyor chain and fixed there.

The chain conveyor 31 is fixedly connected to a machine frame, which in addition to ducts for chip suctioning and some electronic components also contains motor mounts with milling motors respectively attached thereto. These motor mounts render possible a free infeed of the motors in an established area in the y and z direction and a rotation about the x axis when the installation is at rest. Through these adjustment options it is possible to adjust the side milling cutters flange-mounted to the engines such that the panels 2 conveyed past in the transport direction T can be machined. The motors, and thus the individual processing stations 32, 32*a*, 33, 33*a*, 34, 34*a*, 35, 35*a*, are arranged oppositely in pairs one behind the other in an alignment based on the transport direction T. The milling cutters not shown in detail here have a structure such that by covering all essentially four to five processing stations 32, 33, 34, 35; 32*a*, 33*a*, 34*a*, 35*a* half of a commercially conventional glueless connection profile can be produced on each side edge I, II.

In order to prevent inaccuracies or looseness in the bearing of the chain links from being transferred to the panels 2 to be processed, which would make an exact milling of the profiles impossible, the profiling machines 36 have precisely defined datum planes. In the case of these profiling machines, these datum planes are realized in the form of so-called supports, which are firmly fixed to the chain conveyors 36 and on the top thereof have a polished hard metal plate 37, which represents the datum plane. The panels 2 to be profiled slide over this plate 37 during the processing. In order to ensure that a removal of the panels 2 from these plates 37 does not occur, they are pressed by so-called pressure shoes 38 onto the hard metal plate 37. The pressure shoes 38 are moved by pneumatic cylinders in the direction of the hard metal plate 37, which renders possible a free adjustability of the spring force to be applied.

This double-ended profiler structured in this manner and known per se is supplemented according to the invention by a further processing station 40 which differs fundamentally from the processing stations described above. In the processing station 40 the construction permits a controlled movement of the milling tools 41 during the processing, whereby the production of non-continuous slots is possible. The system of the processing station 40 is fundamentally identical on both machine sides in principle, wherein the installations differ, however, in that on the one machine side the milling tools 41 can be moved dynamically essentially in the z direction and on the other machine side the milling tools 41 can be moved dynamically essentially in the y direction.

Several smaller milling tools 41 with a diameter of 30 to 50 mm are arranged one behind the other in the transport direction T. The number of the milling tools 41 per processing station 40 corresponds to the contours to be produced. Usually two to four milling tools 41 are used. These milling tools 41 are flange-mounted to an auxiliary gearbox 42 that is driven by a motor 43. The motor 43 can be firmly connected to the gearbox 42. However, the power transmission can also be carried out flexibly via a toothed belt or a flexible shaft. The gearbox 42 and the milling tools 41 and optionally also the motor 43 are attached at one end of a swivel-mounted carrier 44. The carrier 44 is swivel-mounted via joint 45 between its end points similar to a rocker. On the end of the carrier 44 lying opposite the milling tools 41, a servo motor 46 is attached with a displacement spindle 47, which can move the carrier 44 and thus the milling tools 41 attached to the other end on a circular track (arrow P) around the joint 45. A telescopic cylinder can be used instead of a servo motor 46. Instead of a displacement spindle 47, the servo motor 46 can also interact with a radial cam, a crankshaft drive or a system with similar mode of operation.

Alternatively, a system can be used that has only a milling tool 41, which is attached directly to the milling motor. The motor and milling tool 41 are firmly connected to a highly dynamic linear motor (not shown) which, together with a balancing spring element (not shown), renders possible very rapid movements of the motor and milling tool 41 in the z direction or y direction. With a system of this type, cycle times of approx. 100 to 200 panels 2 per minute are possible, because it has higher dynamics than the system previously described with which 50 to 100 panels 2 per minute can be milled.

The panels 2 are fed into the double ended profiler 30. The separation of the panels 2 inserted into a loader is thereby carried out by the movement of the chain conveyor 31, wherein cams (not shown) installed on individual chain links respectively draw one panel 2 out of the loader. The respective panels 2 are moved via the chain conveyor 31 in the transport direction T (x direction). After a short conveyor path, each panel 2 arrives under the top pressure belt and is pressed firmly thereby onto the chain conveyor 31. With further conveyance of the panel 2 in the transport direction T, this panel enters the first processing station 32. It initially runs thereby onto the support 37 present at each processing station 32, 33, 34, 35 and is pressed thereon by the pressure shoe 38 likewise present. When approximately the center of the support 37 has been reached, the milling cutter set in rotation by a motor catches into the panel 2 and begins the machining. The processing in the individual stations 32, 33, 34, 35 is structured such that the first milling tool 41 takes over the rough preliminary chip removal and the breaking of the hard decorative layer, the tool of the second station 33 and that of the last processing station 35 mill the actual holding profile into the panels 2, which in this case is a hook profile with rigid locking surfaces for vertical locking.

The tool of the third processing station 34 is essentially responsible for the production of a clean closing edge and/or for the production of a bevel on the decorative side 18 of the panel 2. Once the panel 2 has passed this processing station 34, it has a complete hook profile with rigid vertical locking.

If the panel 2 runs into the processing station 40 according to the invention additionally flange-mounted to the double ended profiler 30, a control signal is triggered by a sensor 48 (cf. FIG. 10), which control signal activates the servo motor 46, whereby the carrier 44 is swiveled about the joint 45 and the milling tools 41 dip from the underside 19 of the panel 2 into the core 17 and mill in the slots 10. At the same time a number of slots 10 are produced, which corresponds to the number of the milling tools 41 in the processing station 40. Before the panel 2 has completely passed through the processing station 40, the carrier 44 is swiveled back and the milling tools 41 are drawn out of the core 17 of the panel 2 so that slots 10 are produced which do not extend over the full length L of the side edge (here the transverse side).

The dipping of the milling tools 41 is carried out while the panel 2 is being transported. FIG. 2 shows the intake 10*b* and outlet 10*c* of the milling tool 41, with which the vertical slot 10 is milled. FIG. 6 shows the intake 11*b* and the outlet 11*c* of the milling tool 41, with which the horizontal slot 11 was milled. The intakes 10*b*, 11*b* and the outlets 10*c*, 11*c* are arched, wherein the radius depends on the feed rate of the panel 2. FIGS. 10, 12 show a panel 2 in which three vertical slots 10 as well as three horizontal slots 11 with the corresponding intakes 10*b*, 11*b* and outlets 10*c*. 11*c*.

The alternative processing system with only one milling tool 41 can likewise produce a non-continuous contour with the aid of corresponding movement of the linear motor. However, since only one milling tool 41 is used, this system must perform several infeed motions accordingly to produce the same number of contours.

In order to render possible an exact movement control with both variants, furthermore data, such as control signals of the doubled ended profile 30 and sensor data (for example from rotary encoders) are used to the light barriers used.

The processing station 40, with which the vertical slots 10 are produced has been described. If the horizontal slots 11 are to be milled, the processing station 40 can be arranged at the same location. The carrier 44 is arranged rotated by 90° accordingly so that the milling tool 41 then on a circular track dips into the core 17 which runs tangentially to the top 18 of the panel 2 and not to the side edge.

FIGS. 11 and 12*a*, 12*b* show a device with which respectively one milling tool 41 of a processing station 40 can be swiveled from an inactive position into the processing position. The motor 43 and the transmission 42 are respectively attached to the bottom of the carrier 44. An actuator 50 is attached by one end with a joint 51 to the housing 49 of the processing station 40 and by the other end on a joint 52 to the carrier 44. When the actuator rod 54 is retracted and extended the carrier 44 and thus the milling tool 41 moves around the shaft 53. To this end the carrier 44 is attached to the shaft 53 via a bearing block 39.

FIGS. 13, 14 and 15 show basic alternatives to the actuator 50 in order to bring the milling tool 41 into its operating position. The carrier 44 on which the milling tool 41 is attached, can be moved into a guide 62 via a cam 60 driven in a rotary manner. The cam 60 presses the carrier 44 in the direction of the panel 1. The restoring force is generated by the springs 61 (FIG. 13). With the principle explained in FIG. 14, the carrier 44 can be displaced in the transport direction T as well as in a direction perpendicular thereto, that is in the horizontal direction H or the vertical direction V. Through the rotary motion of the crank disk 70 by means of the connecting rod 71 the displacement parallel to the transport direction T is initiated. With this movement the carrier 44 passes a cam 73, via which then the movement is initiated in a direction V or H perpendicular to the transport direction T. The carrier 44 then slides in guide 72 in the direction of the panel 1 so that the milling tool 41 can be brought into contact with the panel 1. In the drive principle shown in the FIG. 15, the carrier 44 is connected to the crank disk 80 directly so that via the crank disk 80 a movement is simultaneously initiated in the transport direction T and in a direction V or H that is perpendicular thereto.

LIST OF REFERENCE NUMBERS

| | |
|---|---|
| 1 | Panel |
| 1' | Panel |
| 2 | Panel |
| 2' | Panel |
| 3 | Tongue element |
| 3' | Tongue element |
| 3a | End |
| 3b | End |
| 3c | Outer edge |
| 3d | Lower edge |
| 3e | Top |
| 4 | Locking edge |
| 5 | Shoulder |
| 6 | Shoulder |
| 9 | Groove |
| 9a | Groove bottom |
| 10 | Slot |
| 10a | Inner wall |
| 10b | Intake |
| 10c | Outlet |
| 11 | Slot |
| 11b | Intake |
| 11c | Outlet |
| 12 | Top surface |
| 13 | Contact surface |
| 14 | Dust pocket |
| 15 | Vertical surface/contact surface |
| 16 | Vertical surface/contact surface |
| 17 | Core |
| 18 | Top |
| 19 | Bottom |
| 20 | Hook element |
| 20' | Hook element |
| 21 | Hook element |
| 22 | Locking elements/locking lug |
| 23 | Dust pocket |
| 24 | Surface |
| 30 | Double ended profiler |
| 31 | Chain conveyor |
| 32 | Processing station |
| 32a | Processing station |
| 33 | Processing station |
| 33a | Processing station |
| 34 | Processing station |
| 34a | Processing station |
| 35 | Processing station |
| 35a | Processing station |
| 36 | Profiling machine |
| 37 | Contact surface/hard metal plate |
| 38 | Pressure shoe |
| 39 | Bearing hole |
| 40 | Processing station |
| 41 | Milling tool |
| 42 | Transmission |
| 43 | Motor |

-continued

| | |
|---|---|
| 44 | Carrier |
| 45 | Joint |
| 46 | Servo motor |
| 47 | Spindle |
| 48 | Sensor |
| 49 | Housing |
| 50 | Actuator |
| 51 | Joint |
| 52 | Joint |
| 53 | Shaft |
| 60 | Cam |
| 61 | Spring |
| 62 | Guide |
| 70 | Crank disk |
| 71 | connecting rod |
| 72 | Guide |
| 73 | Cam |
| 80 | Crank disk |
| 81 | Connecting rod |
| E | Plane |
| E1 | Plane |
| H | Horizontal direction |
| L | Length |
| P | Circular track |
| T | Transport direction |
| V | Vertical direction |
| I | Side edge |
| II | Side edge |
| $\alpha$ | Angle |

The invention claimed is:

1. A method for processing a side edge of a panel with a core, which on at least two side edges lying opposite has profiles corresponding to one another such that two identically embodied panels can be joined and locked to one another in the horizontal and vertical direction by an essentially vertical joining movement, wherein the locking in the vertical direction can be produced by at least one tongue element formed in one piece from the core and moveable in the horizontal direction, the tongue element during the joining movement snaps in behind a locking edge extending essentially in the horizontal direction and the tongue element is exposed by at least one essentially vertical slot with respect to the core, and at least one of the slots extends entirely through the core and is not embodied in a continuous manner over the entire length of the side edge, wherein the at least one non-continuous slot is produced by at least one tool such that while the panel is conveyed in a transport direction under the tool, the tool dips into the core of the panel by a swivel motion and is lifted out again in the opposite direction before the panel has been completely conveyed past under the tool.

2. The method according to claim 1, wherein the tool is guided on a circular track.

3. The method according to claim 1, further comprising machining is carried out in a chip removing manner.

4. The method according to claim 1, further comprising to produce several non-continuous slots a plurality of tools spaced apart from one another is provided in the transport direction, wherein the tools dip into the core of the panel simultaneously.

5. The method according to claim 1, further comprising additionally at least one essentially horizontal slot is provided to expose the tongue element.

6. The method according to claim 1, wherein the panel to be profiled slides over a plate during the processing.

7. The method according to claim 6, further comprising pressing a pressure shoe towards the plate to ensure that the panel does not fall off of the plate.

8. The method according to claim 1, wherein the panel passes by a plurality of tools which produce a plurality of non-continuous slots while the panel is conveyed in the transport direction under the plurality of tools.

9. The method according to claim 8, wherein the plurality of tools each dip into the core of the panel by a swivel motion and are lifted out again in the opposite direction before the panel has been completely conveyed past under the plurality of tools.

10. The method according to claim 1, wherein the slot comprises intakes and outlets which are arched due to movement of the panel, wherein a radius of the arches depends on a feed rate of the panel.

11. The method according to claim 1, further comprising sensing a position of the panel and dipping the tool in the swivel motion based on the position of the panel.

* * * * *